US008335668B2

(12) United States Patent
Taggart et al.

(10) Patent No.: US 8,335,668 B2
(45) Date of Patent: Dec. 18, 2012

(54) SYSTEMS AND METHODS FOR FINITE ELEMENT BASED TOPOLOGY OPTIMIZATION

(75) Inventors: David G. Taggart, North Kingstown, RI (US); Peter Dewhurst, West Kingston, RI (US); Arun U. Nair, Raleigh, NC (US)

(73) Assignee: The Board of Governers For Higher Education, State of Rhode Island And Providence Plantations, Providence, RI (US)

( * ) Notice: Subject to any disclaimer, the term of this patent is extended or adjusted under 35 U.S.C. 154(b) by 0 days.

(21) Appl. No.: 13/052,760

(22) Filed: Mar. 21, 2011

(65) Prior Publication Data

US 2011/0166833 A1    Jul. 7, 2011

Related U.S. Application Data

(63) Continuation of application No. 12/137,160, filed on Jun. 11, 2008, now abandoned, which is a continuation of application No. PCT/US2006/062302, filed on Dec. 19, 2006.

(60) Provisional application No. 60/751,500, filed on Dec. 19, 2005.

(51) Int. Cl.
*G06F 17/50* (2006.01)
*G06F 17/10* (2006.01)

(52) U.S. Cl. ................................. 703/1; 703/2

(58) Field of Classification Search .................. None
See application file for complete search history.

(56) References Cited

OTHER PUBLICATIONS

Ansola et al. "An integrated approach for shape and topology optimization of shell structures", Computers and Structures, 2002, pp. 449-458.*
Hsu et al. "Interpreting results form topology optimization using density contours", Computers and Structures, 2001, pp. 1049-1058.*
Lee et al. "Shell topology optimization using the layered artificial material model", International Journal for Numerical Methods in Engineering, No. 47, 2000, pp. 843-867.*
Zhou et al. "Topology optimization of structures under multiple load cases using a fiber-reinforced composit material model", Comput. Mech., Aug. 31, 2005, pp. 163-170.*

* cited by examiner

*Primary Examiner* — Suzanne Lo
(74) *Attorney, Agent, or Firm* — Gesmer Updegrove LLP (57) ABSTRACT

A method is disclosed of providing an optimal minimum mass topology for a structure based on a set of design criteria including at least one support point and at least one force to be applied to the structure. The method includes the steps of: identifying a plurality of nodes within a structure design domain, and assigning an initial density value to said plurality of nodes; conducting a finite element analysis on the nodes; determining one of a stress intensity or strain energy values for each node; ranking the nodes by relative stress intensity or strain energy values; adjusting the density value for each node; and repeating the steps of conducting a finite element analysis on said nodes, wherein the step of adjusting each density value for each node is performed according to a family of statistical distribution functions that gradually transition to a bimodal distribution wherein nodes are either fully dense or effectively void thereby providing an optimal topology.

18 Claims, 7 Drawing Sheets

SYSTEMS AND METHODS FOR FINITE ELEMENT BASED TOPOLOGY OPTIMIZATION

PRIORITY INFORMATION

This application is a continuation application of U.S. Ser. No. 12/137,160 filed Jun. 11, 2008, which is a continuation application of International Patent Application No. PCT/U.S.2006/62302, filed on Dec. 19, 2006, which claims priority to U.S. Provisional Patent Application 60/751,500, filed on Dec. 19, 2005, all of which are incorporated herein by reference in their entirety.

GOVERNMENT SPONSORSHIP

This invention was sponsored by the National Science Foundation under Project Numbers R032532 and DMI0200058. The United States Government has certain rights to this invention.

BACKGROUND

The present invention relates generally to design optimization methodologies, and relates in particular to design methodologies for developing designs of structures to support a mass with a minimum amount of material.

The design of minimal material (and therefore light-weight) structures is a subject of central importance in the development of a very wide range of products from fighter aircraft to wheel chairs. The design of absolute minimum weight structures requires the identification of an optimal topology of the structural members. For a limited number of loading configurations, analytic methods have been applied to identify optimal topologies. For more general loading configurations however, the optimal topology cannot be determined analytically and numerical procedures become necessary. In recent years, researchers have developed topology optimization schemes that utilize finite element analyses (FEA) to evaluate candidate topologies. Through iterative finite element analyses, these schemes have been shown to converge to known optimal topologies. Various commercially available computer software programs exist for performing FEA.

In particular, the homogenization method has been proposed for generating optimal topologies based on minimization of structural compliance for a given design volume. Homogenization methods include the classic homogenization methods, artificial material models or Solid Isotropic Material Penalization (SIMP) methods. In an alternate approach, referred to as Evolutionary Structural Optimization (ESO), inefficient material in the design domain is removed iteratively. The ESO scheme is a relatively simple algorithm that may be readily implemented in commercial finite element software. Studies have revealed however, that while the ESO method does provide reasonable results in some simple test cases, in more complicated problems it has been shown to fail to provide the optimal topology. The homogenization method is more sophisticated than the ESO but, due to the use of a unique variational principal and the addition of specialized constraint equations, it is not amenable to being incorporated in standard finite element software. Topology optimization methods incorporating features of both these methods are called hybrid methods.

In the topology optimization methods described above, the optimal topologies are generated based on design variables computed over an FEA element, which leads to numerical instabilities such as checkerboarding and mesh dependency, and node based approaches have been proposed to address this where material density distribution is defined as a nodal variable. The tedious computations involved in determination of effective Young's modulus and the need for customized finite element codes, pose significant limitations to homogenization methods. Evolutionary optimization methods, where least stressed elements were removed successively from the design domain, have gained popularity as these methods are simpler to implement and have been shown to generate good topologies utilizing standard finite element codes. Other conventional techniques include a constant weight fully stressed (CFS) method in which the total volume of material is held constant. An advantage of this method is that the density levels of elements are allowed to increase or decrease. Such methods, however, are also not immune to numerical instabilities and other limitations.

There is a need, therefore, for a more flexible, efficient and economical methodology for performing topology optimization analyses of structures.

SUMMARY

The invention provides a method for providing an optimal topology for a structure based on a set of design criteria including at least one support point and at least one force to be applied to the structure. The method includes the steps of identifying a plurality of nodes within a structure design domain, and assigning an initial density value to the plurality of nodes. The method also includes the steps of conducting a finite element analysis on the nodes, determining a stress intensity or strain energy value for each node, ranking the nodes by relative stress intensity or relative strain energy values, and adjusting the density value for each node. The method also includes the step of repeating the steps of conducting a finite element analysis on the nodes, determining the relative stress intensity or relative strain energy value for each node, ranking the nodes by relative stress intensity values, and adjusting the density value for each node through a predetermined number of steps to provide an optimal topology. This step process is carried out through a family of probability distribution functions which ensure a smooth transition from an initial uniform partial density state to a final bimodal state of voids and fully dense material regions. The use of the probability distributions also ensures, through the constant probability mean, that the mass remains constant. In other FEA based optimization methods, the maintaining constant mass requires a separate adjustment at each iteration.

In accordance with an embodiment, therefore, the invention provides a method of providing an optimal minimum mass topology for a structure based on a set of design criteria including at least one support point and at least one force to be applied to the structure. The method includes the steps of: identifying a plurality of nodes within a structure design domain, and assigning an initial density value to said plurality of nodes; conducting a finite element analysis on the nodes; determining one of a stress intensity or strain energy values for each node; ranking the nodes by relative stress intensity or strain energy values; adjusting the density value for each node; and repeating the steps of conducting a finite element analysis on said nodes, wherein the step of adjusting each density value for each node is performed according to a family of statistical distribution functions that gradually transition to a bimodal distribution wherein nodes are either fully dense or effectively void thereby providing an optimal topology.

BRIEF DESCRIPTION OF THE DRAWINGS

The following description may be further understood with reference to the accompanying drawings in which.

The drawings are for illustrative purposes only.

DETAILED DESCRIPTION OF THE ILLUSTRATED EMBODIMENTS

The invention provides topology optimization algorithms that may be implemented as supplemental or front end routines to standard commercial programs, allowing the designer to use finite element codes that are familiar, efficient, and currently available from many different sources. In an example, a methodology of the invention may be implemented with the finite element analysis program, Abaqus, sold by Abaqus, Inc. of Providence, R.I., through the use of a set of FORTRAN programming language user subroutines. With this implementation, a designer familiar with using Abaqus may easily perform topology optimization without the need for acquiring and learning new software. It is expected that this scheme may also be easily implemented in other popular finite element software.

Many finite element based topology optimization methods treat design variables such as material density, stress, etc. as an element variable. Such methods are referred to as element based methods. Element based methods estimate design variables such as density, stress, strain, strain energy density, etc. by averaging at the element centroid or at Gauss points. Such treatments do not guarantee inter-element continuity and may result in a structure that has elements with alternating high and low density areas referred to as checkerboarding.

The present invention provides a node based approach in accordance with an embodiment of the invention in which material density is specified at nodes. In a node based approach, design variables are defined as nodal variables and are interpolated within each element. This ensures inter-element continuity and as a result, prevents numerical instabilities. In order to update nodal density values, stress intensities (such as nodal stresses, strains or strain energies) are computed by extrapolation of integration point stresses to the nodes and averaging stress components from adjacent elements. This stress averaging approach is commonly used in finite element post processing of stresses. Material properties required at element Gauss points are computed using appropriate interpolation functions.

Figure 1:
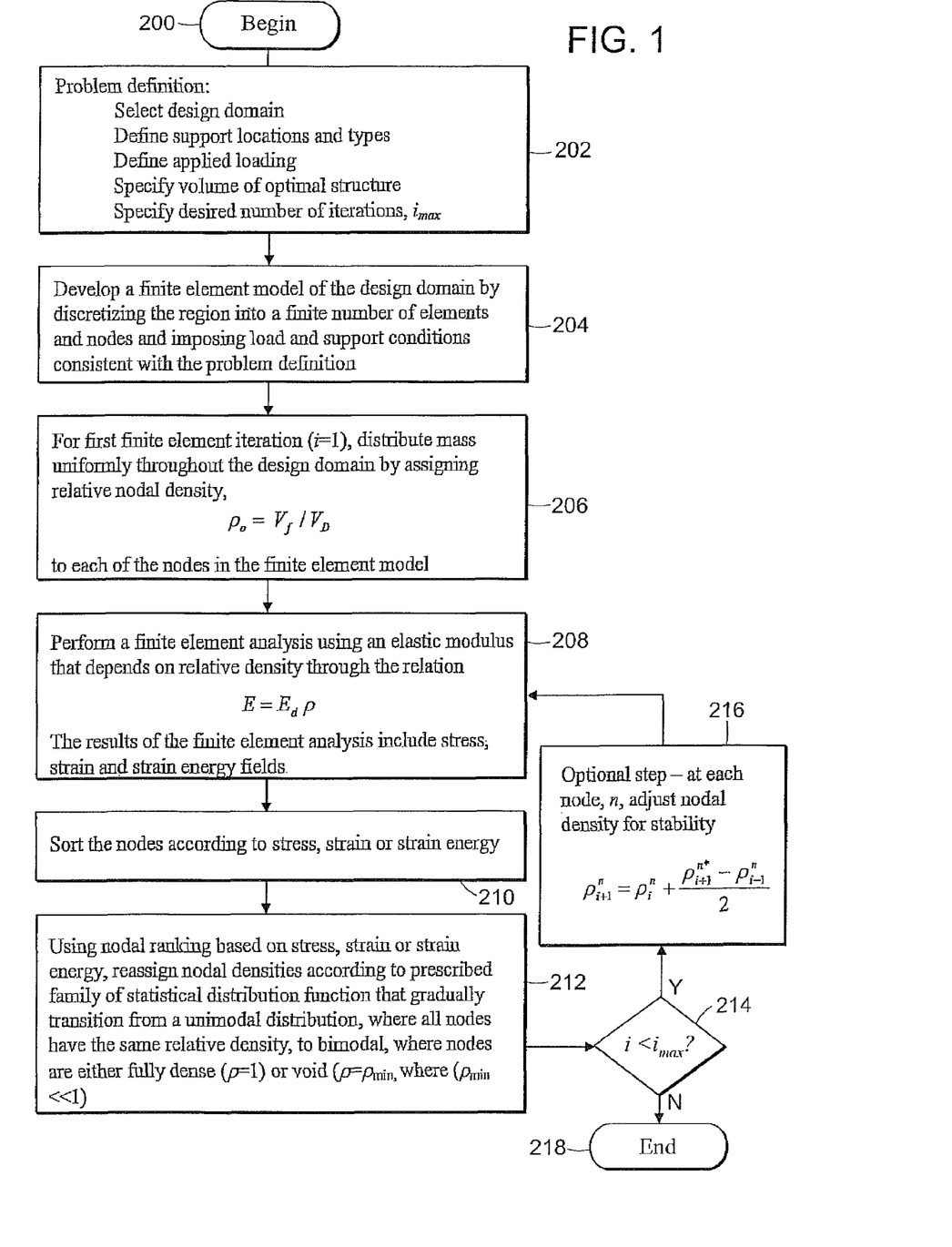
FIG. 1 shows an illustrative view of the process steps in the topology optimization method wherein a unique aspect of the method occurs in step 212, which force convergence to the optimal topology in a pre-arranged number of iterations $i_{max}$ (step 214)

With reference to FIG. 1, an optimization algorithm used in an embodiment of the invention involves the following steps. The process begins (step 200) and the first step (step 202) is to define the problem. The problem definition includes specification of the two or three dimensional space that is available for the structure. In particular, the design domain, support locations and types, applied loading, volume of optimal structure, and desired number of iterations $i_{max}$ are all defined.

For cases with infinite or semi-infinite design domains, a finite size region that extends well beyond the expected topology is specified. The location and type of support conditions must also be specified, as well as the location, direction and magnitudes of any applied mechanical loads that the structure must support. Finally, the problem definition must specify the desired final volume, or mass, of the optimal structure.

A finite element model of the design domain is developed (step 204) consistent with the problem definition parameters (design domain) by discretizing the region into a finite number of elements and nodes and imposing load and support conditions. The domain is typically, though not necessarily, discretized into an array of regular shaped elements. Load and support conditions consistent with the problem definition are applied to the model.

The desired final mass of the structure is specified at the beginning of the analysis and is held fixed through the course of the numerical iterations. This material mass is initially distributed uniformly throughout the design domain resulting in a uniform, partially-dense material. For first finite element iteration (i=1), distribute mass uniformly throughout the design domain by assigning (step 206) to each node in the finite element model a relative nodal density of:

$$\rho_o = V_f / V_D$$

where $V_f$ is the final structural volume and $V_D$ is the volume of the partially-dense design domain. Since all of the nodes are initially assigned this relative density, the distribution of material densities may be described by the probability distribution function, $f_o$, given by $$f_o(\rho) = \delta(\rho - \rho_0)$$

where δ is the Dirac delta function and ρ is the relative material density ($0 \leq \rho \leq 1$). The corresponding cumulative distribution function, $F_o$, is given by $$F_o(\rho) = H(\rho - \rho_o)$$

where H is the Heaviside step function.

A finite element analysis is then performed (step 208) using an elastic modulus that depends on relative density through the relation $$E = E_d \rho$$

The results of the finite element analysis include stress, strain and strain energy fields.

The nodes are then sorted (step 210) according to stress, strain or strain energy. The nodes are then ranked (step 212) based on stress, strain or strain energy, and nodal densities are assigned according to a prescribed family of statistical distribution functions that gradually transition from a unimodal distribution, where all nodes have the same relative density, to bimodal, where nodes are either fully dense ($\rho=1$) or void ($\rho = \rho_{min}$, where $\rho_{min} \ll 1$). The process then repeats steps 208-212 until $i = i_{max}$ (step 214), whereupon the process ends (step 218). The process may also optionally include a step of adjusting (step 216) nodal density for stability as discussed in more detail below.

The desired final material distribution is characterized by distinct regions of fully dense material ($\rho=1$) and regions that have zero relative density. The geometry of the fully dense regions represent the optimized structural topology. For the finite element calculations, a material density of zero would result in zero material stiffness and a singular global stiffness matrix. For these calculations, these regions are assigned a very small relative density, $\rho_{min} \ll 1$. The resulting final material distribution can be described by the probability distribution function, $f_f$, given by $$f_f(\rho) = (1 - \rho_o)\delta(\rho - \rho_{min}) + \rho_o \delta(\rho - 1)$$

and the corresponding final cumulative distribution is given by $$F_f(\rho) = (1 - \rho_o)H(\rho - \rho_{min}) + \rho_o H(\rho - 1)$$

Note that for both the initial and final material distributions, the specified material mass is maintained.

Figure 2:
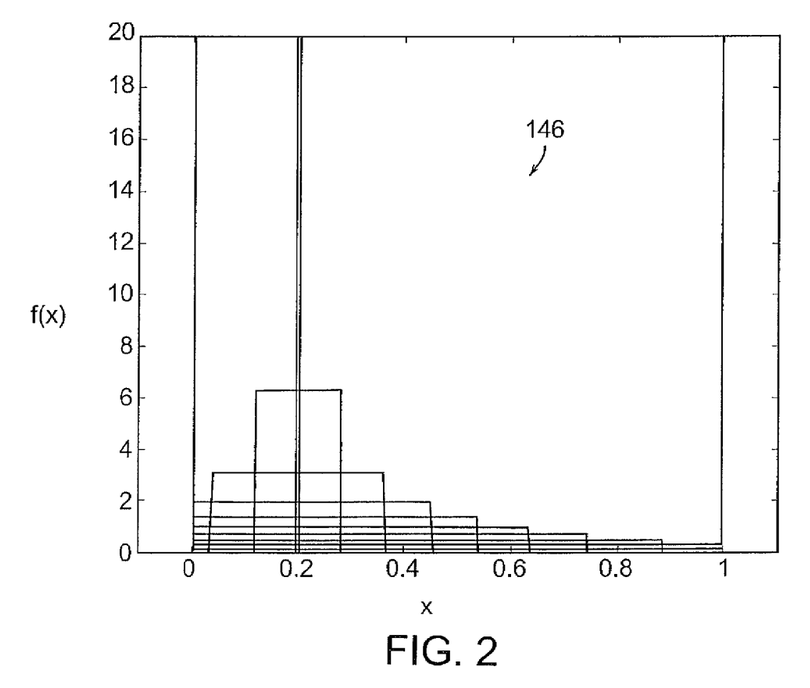
FIG. 2 shows an illustrative graphical representation of a transition process from initial to final probability density distribution in a system in accordance with an embodiment of the invention.
Figure 3:
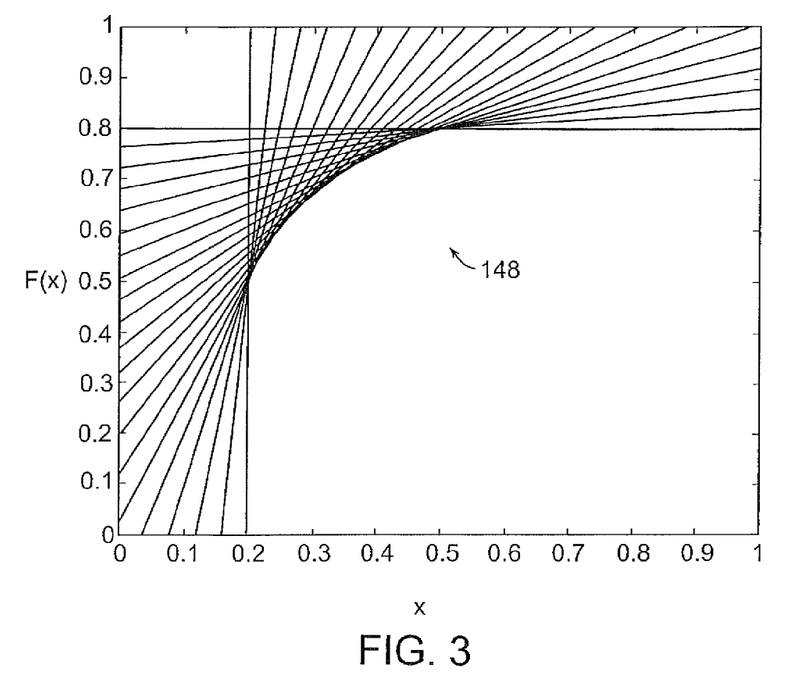
FIG. 3 shows an illustrative graphical representation of a transition process from initial to final cumulative probability distribution in a system in accordance with the embodiment of the invention.

For intermediate iterations, families of probability and cumulative probability distribution functions can be established which provide a smooth transition from the initial distribution for $f_o(\rho)$ and $F_o(\rho)$ above to the final distributions for $f_f(\rho)$ and $F_f(\rho)$. FIGS. 2 and 3 illustrate the gradual transition from the initial to the final probability and cumulative probability distributions respectively. Conditions for the probability distribution function are that all material points have densities between zero and one, leading to the requirement $$\int_0^1 f(\rho) d\rho = 1$$

The requirement that the total mass of material be held constant is satisfied by the condition that the average density remain constant according to $$\int_0^1 \rho f(\rho) d\rho = \rho_o$$

Finally, a scheme is required to incrementally transition from the initial to the final material distribution.

One example of a family of distribution functions is given by the uniform distribution. For this family of distribution functions, FIG. 2 shows at 146 the transition from initial to final probability distributions, and FIG. 3 shows at 148 the transition from initial to final cumulative probability distribution.

Another example of a family of distribution functions is given by the beta distribution $$f(\rho) = \beta(\rho, r, s) = \frac{\rho^{r-1}(1-\rho)^{s-1}}{B(r, s)}$$

where r and s are adjustable parameters and $$B(r, s) = \frac{\Gamma(r)\Gamma(s)}{\Gamma(r+s)}$$

where $\Gamma$ is the gamma function. The corresponding cumulative distribution function, also known as the incomplete beta function, is given by $$F(\rho) = \beta_{inc}(\rho, r, s) = \frac{1}{B(r, s)} \int_0^\rho (\rho')^{r-1}(1 - \rho')^{s-1} d\rho'$$

This choice of material distribution functions satisfies this for any combination of parameters r and s. It can be shown that the requirement for constant average density $\rho_o$ is satisfied if $$s = \left(\frac{1 - \rho_o}{\rho_o}\right) r$$

Figure 4:
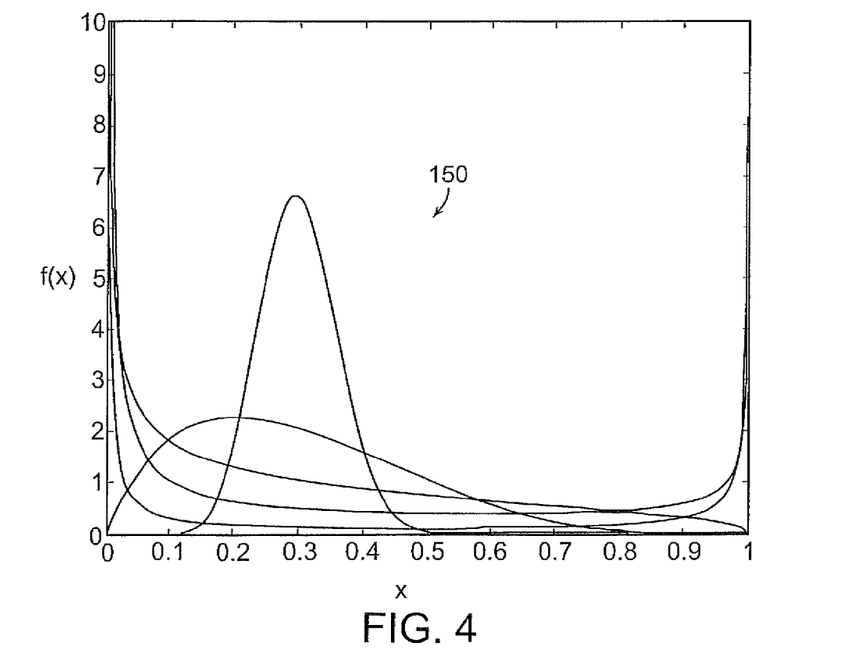
FIG. 4 shows an alternative illustrative graphical representation of a transition process from initial to final probability distribution in a system in accordance with an embodiment of the invention using a family of beta probability density distributions.
Figure 5:
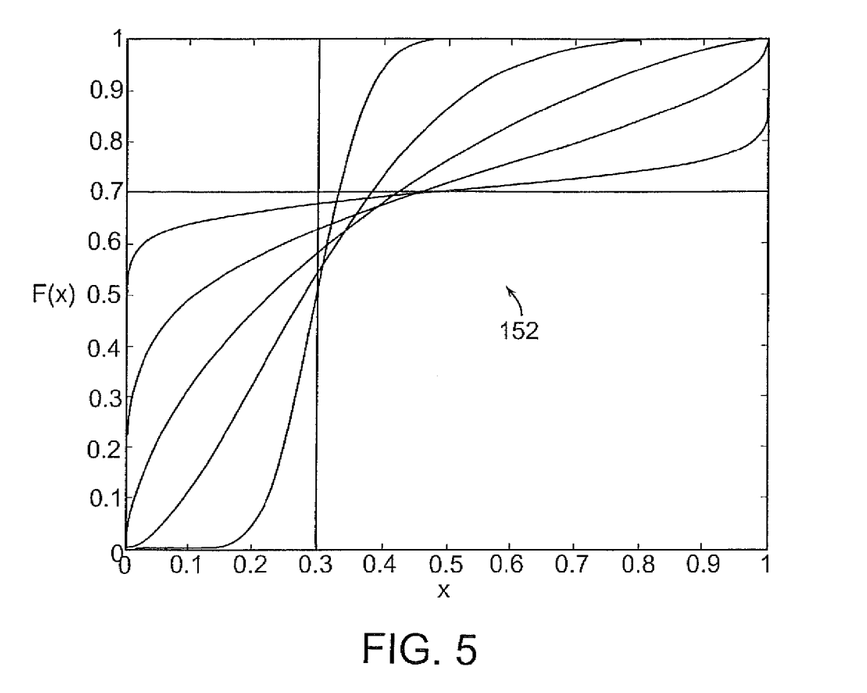
FIG. 5 shows an alternative illustrative graphical representation of a transition process from initial to final cumulative probability distribution in a system in accordance with the embodiment of the invention using the family of beta probability distributions.

To provide a smooth transition from the initial to the final material distribution, the following scheme can be imposed. A non-dimensional time parameter, t, is defined such that $t=0$ corresponds to the initial material distribution and $t=1$ corresponds to the final material distribution. To provide a smooth transition from the initial unimodal distribution where all material points are assigned the initial density to the final bimodal distribution where all material points are fully dense or have essentially zero density, an appropriate function r(t) must be specified. This is achieved by determining r(t), $0 \leq t \leq 1$, such that $$\int_0^1 |\beta_{inc}(\rho', r(t), s) - F_f(\rho')| d\rho' = 2(1-t)\rho_o(1-\rho_o)$$

where $F_f$ is the final bimodal cumulative distribution. The function r(t) can be determined numerically during the finite element iterations numerically using standard root finding and numerical integration algorithms. Alternatively, the function $r(t, \rho_o)$ can be prescribed analytically or established a priori with values stored in a lookup table; for example, using a Fortran DATA statement. During the finite element iterations, a bicubic interpolation algorithm is typically used to determine the desired values of $r(t, \rho_o)$. With this scheme, for the family of distribution functions described by the beta distribution, FIG. 4 shows at 150 the transition from initial to final probability distributions, and FIG. 5 shows at 152 the transition from initial to final cumulative probability distribution.

At each finite element iteration, the desired r(t) is used to assign nodal densities according to the current density distribution function. The nodal density assignment is performed based on the sorted nodal stresses, strains or strain energies computed from the previous iteration. Nodes with relatively low stress, strain or strain energy are assigned reduced nodal densities and nodes with relatively high stress, strain or strain energy are assigned increased nodal densities. Through direct assignment of nodal densities, the desired progression of density distributions is enforced. In computing the element stiffness matrices, the nodal density field is interpolated to give the Young's modulus, E, at each Gauss point according to the relation $$E = E_d \rho$$

where $E_d$ is the fully dense Young's modulus. Since the density of each node is reassigned at each finite element iteration, convergence to the final topology can be achieved in relatively few finite element iterations.

In the material redistribution scheme described above, nodal densities are assigned based on global nodal strain energy distributions with no consideration of the previous density history of a given node. As a result, if too few iterations are performed, numerical instabilities can occur. To avoid such instabilities, a scheme similar to the Euler method for the numerical solution of first order ordinary differential equations is used (step 216). In this scheme, the density at node n at iteration i+1 is computed using $$\rho_{i+1}{}^n = \rho_i{}^n + \Delta\rho^n$$

where $\Delta\rho^n$ is computed from the gradient of $\rho^n$ at iteration i. This gradient is estimated by fitting a quadratic interpolation through the points $\rho^n_{i-1}$, $\rho^n_i$ and $\rho^{n*}_{i+1}$ where $\rho^{n*}_{i+1}$ is the new nodal density obtained from the strain energy sorting algorithm discussed above. The resulting nodal densities are updated according to $$\rho^n_{i+1} = \rho^n_i + \frac{\rho^{n*}_{i+1} - \rho^n_{i-1}}{2}$$

Through this scheme, stable convergence to the final topology can be achieved with relatively few iterations. The topology optimization scheme based on nodal strain energy sorting has been implemented using the commercial finite element code, Abaqus. It is expected that the above process should require fewer required iterations. Several different families of intermediate density distributions have been evaluated and have been shown to perform effectively. Families of intermediate density distributions that reliably predict optimal topologies may be identified for certain applications. Once an appropriate family of functions is identified, numerous two and three dimensional test cases may be evaluated to validate the robustness of the methodology.

In accordance with a further embodiment, the invention provides a methodology for dual strength or dual stiffness (dual property) materials. In this scheme, a fictitious modulus field is introduced such that the optimality criteria for dual property materials are satisfied. The design domain is initially taken to be fully dense. Through iterative finite element analyses, nodal densities are progressively adjusted based on current nodal strain energy levels. After each iteration, a new modulus field is established and the process is repeated, until the domain satisfies optimality criteria for minimum-weight or a prescribed volume reduction is achieved. Illustrative examples are presented in which the material domain converges to discrete structural members that are either in the state of pure tension or compression and are stressed to the tensile and compressive strengths, respectively. The resulting structural topologies satisfy optimality criteria for dual strength minimum-weight topologies.

For example, optimality criteria for generating minimum-volume topologies for dual strength materials require that tensile and compressive members follow the directions of maximum and minimum strain ($\epsilon_T$, $\epsilon_C$) respectively in a virtual strain field which is compatible with the support constraints and which satisfies $$\sigma_T \epsilon_T = \sigma_C \epsilon_C$$

where, $\sigma_T$, $\epsilon_T$ are the tensile strength, tensile strain and, $\sigma_T$, $\epsilon_C$ are the compressive stress and strain respectively.

Introducing a fictitious modulus for members in compression and tension, this requirement reduces to $$\frac{\sigma_T^2}{E_T} = \frac{\sigma_C^2}{E_C}$$

with $E_T$, $E_C$ being modulus in tension and compression respectively.

If it is assumed that the tensile strength is related to compressive strength as $$\sigma_T = n\sigma_C$$

combining the preceding equations provides the relation between the fictitious moduli as $$\frac{E_T}{E_C} = n^2$$

It may be inferred that once the design domain is reduced to regions of uniaxial tension and compression with stress levels reaching the respective strength limits, the resulting structural configuration will correspond to the minimum-volume topology. Initially the domain is assumed to be fully dense. Convergence to the optimal solution requires that regions in the state of uniaxial tension should take the modulus value of $E_T$ and regions in the state of uniaxial compression take on a modulus value of $E_C$. During the course of the finite element iterations, certain regions experience a biaxial stress state. In these regions, appropriate intermediate modulus values must be assigned. A procedure for determining an appropriate modulus value for regions of biaxial stressing is described below.

Let $\sigma_1$ and $\sigma_2$ denote the principal stresses averaged at a given node with $\sigma_1 > \sigma_2$. If $\sigma_1 > \sigma_2 > 0$, the node is predominantly tensile and is assigned a modulus, $E_T$. Similarly $0 > \sigma_1 > \sigma_1$, the node is taken to be in a compressive state and is assigned a modulus, $E_C$. For nodes where $\sigma_1 > 0 > \sigma_2$, an effective strain energy is defined as $$U = \frac{\sigma_1^2}{2E_T} + \frac{\sigma_2^2}{2E_C} - \sqrt{\frac{v_T v_C}{E_T E_C}} (\sigma_1 \sigma_2)$$

This strain energy density is used to define the following effective modulus for regions in a state of biaxial tension/compression $$E_{eff} = \frac{1}{2U}(\sigma_1^2 + \sigma_2^2) - \frac{\sqrt{v_T v_C}}{U}(\sigma_1 \sigma_2)$$

With this formulation, the fictitious modulus varies continuously as the state of stress in a given node varies in the course of finite element iterations. Converged topologies consist of tensile and compressive members where the tensile members have a modulus of $E_T$ and compressive members have a modulus $E_C$. Regions of biaxial stress state essentially disappear during the course of the iteration. The continuous fictitious modulus and density fields associated with the node based approach are shown to provide optimal topologies with no numerical instabilities. The above scheme can readily be extended to three dimensions.

The optimization algorithm used for the present embodiment is the process discussed above with reference to FIG. 1 except that in step 208, ρ is the density at any given iteration with $E_T$ and $E_C$ being the modulus in tension and compression respectively, and that step 208 further includes establishing a fictitious modulus based on optimality criteria from the equation above for $E_{eff}$. The process repeats as in FIG. 1 until convergence criteria are met.

Figure 6:
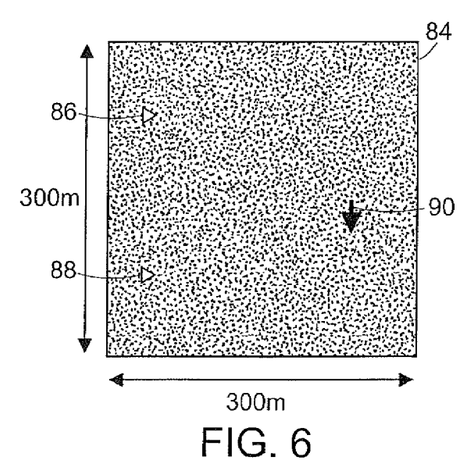
FIG. 6 shows an illustrative diagrammatic view of a design domain of a system to be optimized in accordance with an embodiment of the invention.
Figure 7:
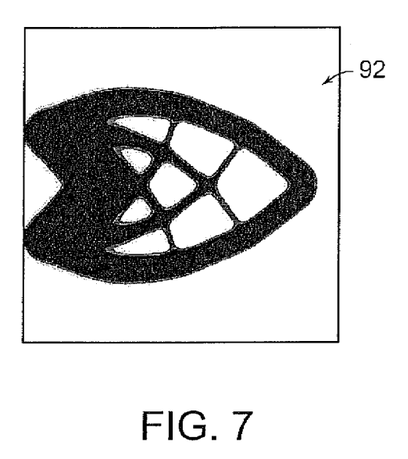
FIG. 7 shows an illustrative diagrammatic view of a minimum weight topology of the domain shown in FIG. 6 in accordance with an embodiment of the invention.
Figure 8:
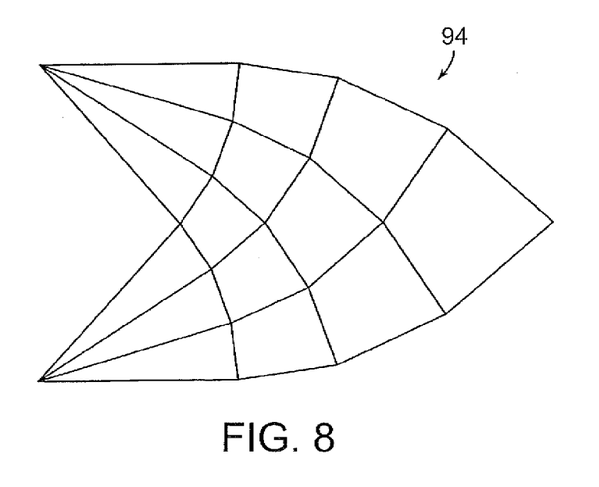
FIG. 8 shows an illustrative diagrammatic view of the analytically optimal topology of the domain shown in FIG. 6 in accordance with an embodiment of the invention.
Figure 9:
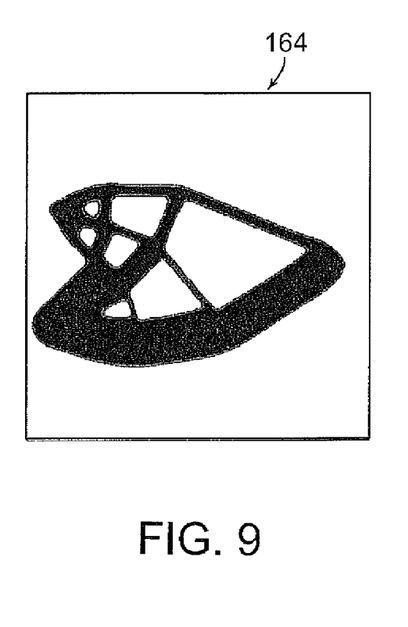
FIG. 9 shows an illustrative diagrammatic view of a minimum weight topology of a domain similar to that shown in FIG. 6 but for a dual strength material in accordance with an embodiment of the invention.
Figure 10:
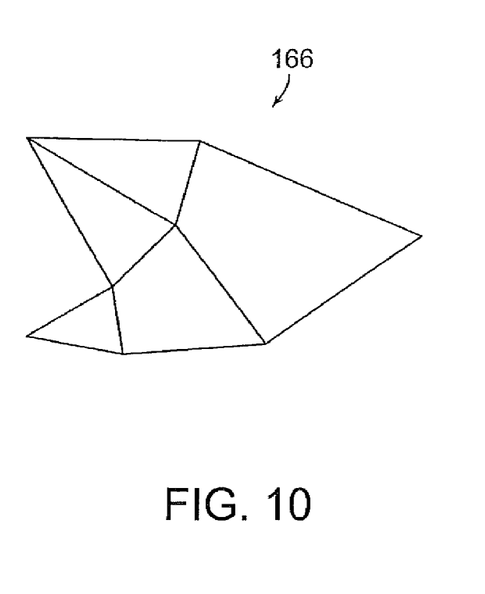
FIG. 10 shows an illustrative diagrammatic view of the analytically optimal topology of a domain similar to that shown in FIG. 6 but for a dual strength material in accordance with an embodiment of the invention.

The optimization procedure was implemented using a user-defined subroutine with the commercial finite element analysis code ABAQUS system based on the above mentioned optimization algorithm. The first example for this embodiment considered involved a cantilever loading with dimensions, loading and boundary conditions as shown in FIG. 6. The structural topology corresponding to a 60% volume reduction is shown in FIG. 7 (after 50 iterations) for the case of material having the same strength in tension and compression. For the case of dual strength material with n=3, the optimal topology is shown at 164 in FIG. 9. The theoretical layout is shown at 166 in FIG. 10. Comparing these numerical results with theoretical layouts for these cases reveals excellent agreement.

Figure 11:
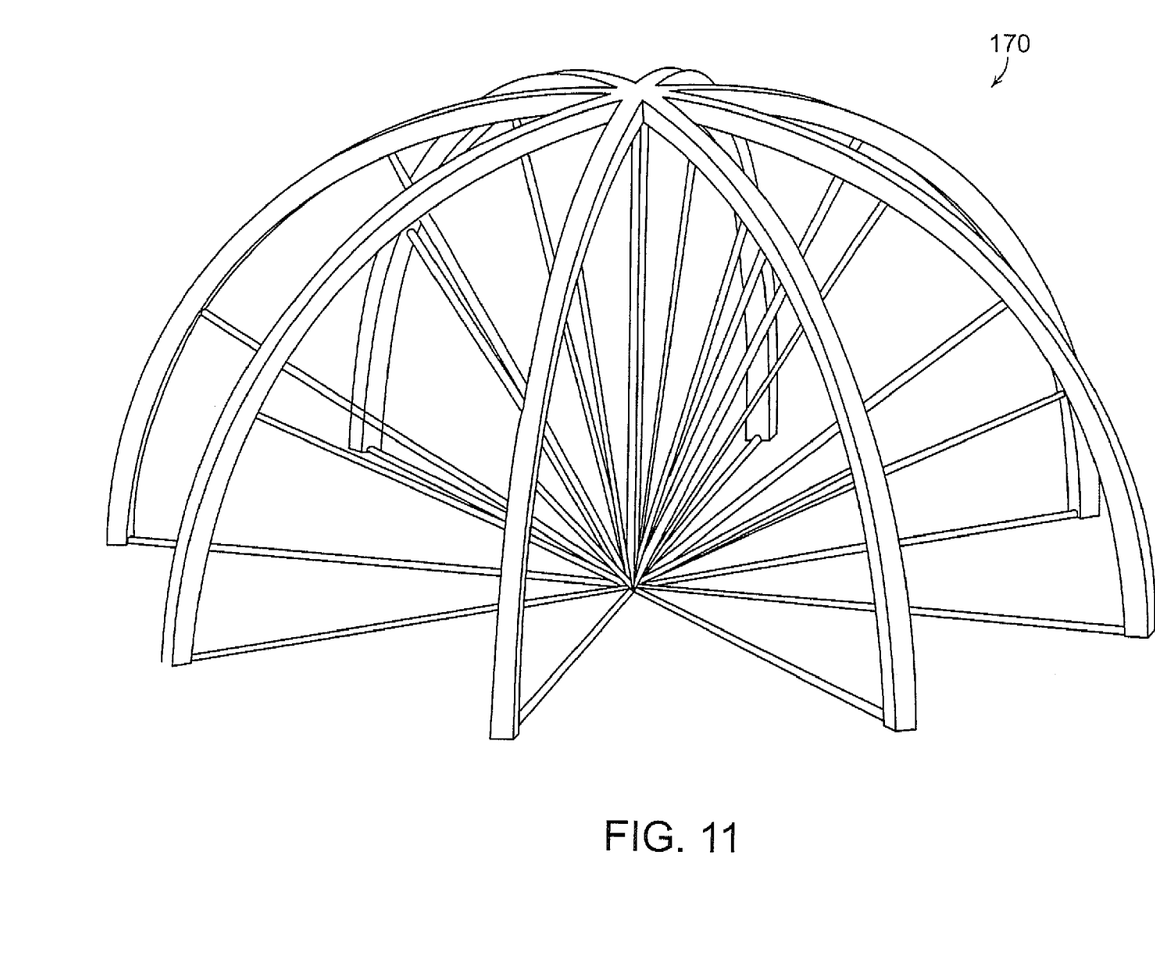
FIG. 11 shows an illustrative diagrammatic view of a test case expected topology for a methodology of the invention for use on a three-dimensional structure.
Figure 12:
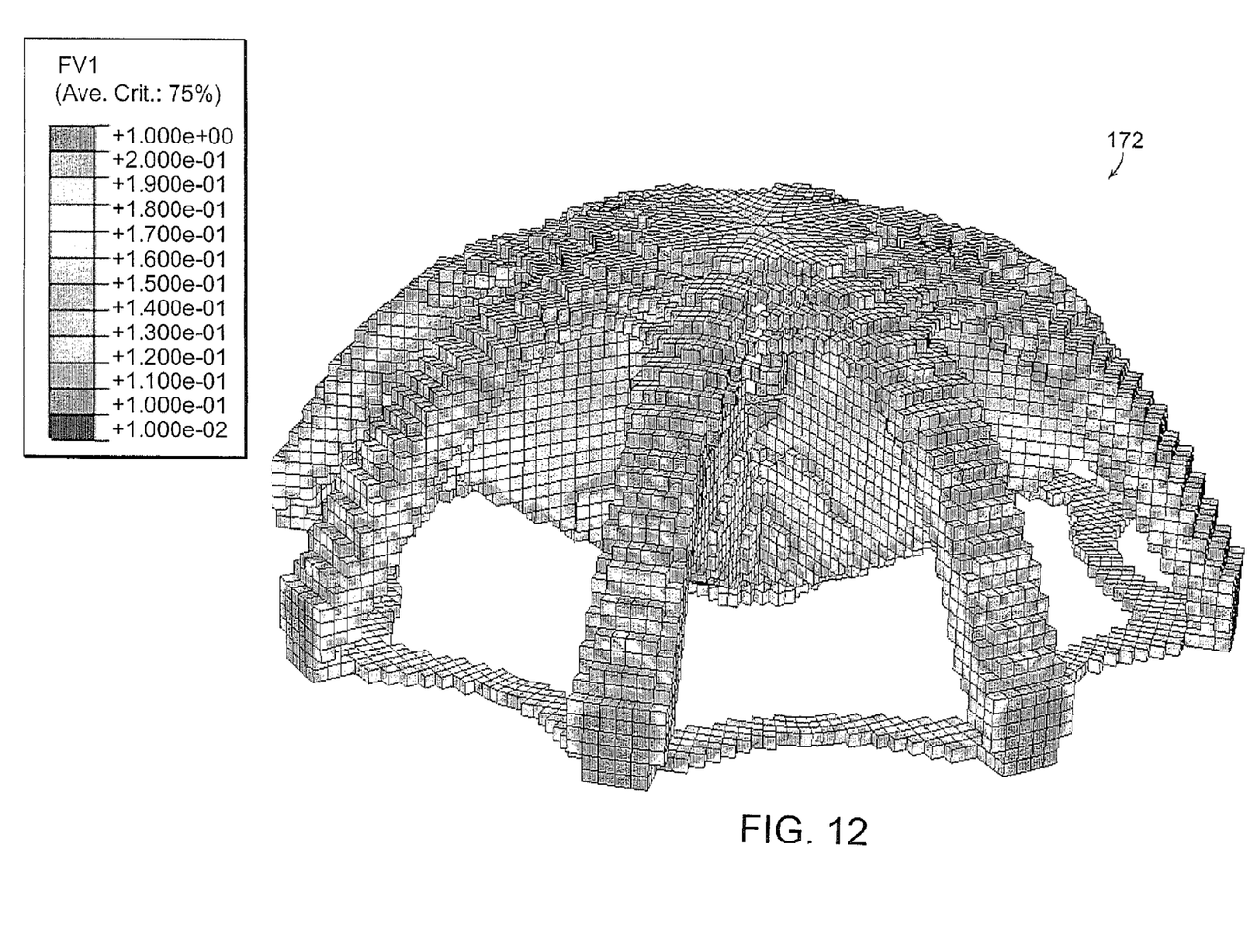
FIG. 12 shows an illustrative diagrammatic view of a minimum weight topology of the test case shown in FIG. 11 in accordance with an embodiment of the invention.

In accordance with further embodiments, the method may be extended to the design of three dimensional structures as well. In this case, the design domain is taken to be three-dimensional, typically but not necessarily rectangular in shape and discretized using hexahedral brick finite elements. Alternatively, tetrahedral finite elements can be utilized. As an example, FIG. 11 shown at 170 the analytic solution for a three dimensional case where a concentrated vertical load is applied at the base of a semi-infinite design domain with eight equally spaced roller supports around a circular path that prevents motion in the vertical and circumferential directions. The corresponding result from the finite element based topology optimization is shown in 172 of FIG. 12.

In yet further embodiments, the invention may be applied to the case of multiple loading. Extension of the above methods to the case of multiple loadings is achieved by considering the stress, strain or strain energy distributions associated with each loading. Again, the design domain is initially taken to be partially dense such that the desired final mass of material is uniformly distributed throughout the design domain. During each finite element iteration, material is gradually redistributed using a family of statistical distribution functions which evolve from the initial unimodal distribution to the final bimodal distribution. The material stiffness is taken to be proportional to the material density such that fully dense regions have the actual material stiffness and material with zero density have essentially zero stiffness. In each iteration, the stress, strain or strain energy at each node is computed. The nodal stress, strain or strain energies are then sorted and the material density is adjusted according to the current desired density distribution. As shown above for cases of single loading, several cases have been examined in which the optimal topology is correctly identified.

For the case of multiple loadings, the material redistribution scheme is applied after each of the separate load configurations have been applied independently to the design domain with the current density distribution. For each node, the maximum stress, strain or strain energy experienced for each load is saved and the nodal stresses, strains or strain energies are sorted. Then, the material redistribution scheme is applied to the sorted maximum nodal stress, strain or strain energies. In this manner, if a region experiences high stress, strain or strain energy during any of the loadings, its density will be increased. As a result, over the course of the iterations, structural members evolve such that all loadings are supported.

For the case of multiple loadings, the time stepping scheme is modified such that numerous load steps are applied. For example, if three load configurations are to be considered, Step 1 is taken to be the first loading, Step 2 is taken to be the second loading, Step 3 is taken to be the third loading, Step 4 is taken to be the first loading for the second iteration, etc. In this example, at the end of every third load step, the maximum stress, strain or strain energy experienced by each of the nodes during the previous three load steps is sorted and the algorithm is applied to determine the density distribution for the next three load steps.

Those skilled in the art will appreciate that numerous modifications and variations may be made to the above disclosed embodiments without departing from the spirit and scope of the present invention.

What is claimed is:

1. A method of providing an optimal minimum mass topology for a structure based on a set of design criteria including at least one support point and at least one force to be applied to the structure, said method comprising executing software instructions to perform the steps of:
    identifying a plurality of nodes within a structure design domain, and assigning an initial density value to said plurality of nodes;
    conducting a finite element analysis on said nodes;
    determining one of a stress intensity or strain energy values for each node;
    ranking the nodes by relative stress intensity or strain energy values;
    adjusting the density value for each node; and
    repeating the steps of conducting a finite element analysis on said nodes, wherein the step of adjusting each density value for each node is performed according to a family of statistical distribution functions that gradually transition to a bimodal distribution wherein nodes are either fully dense or void thereby providing an optimal topology.

2. The method as claimed in claim 1, wherein at each intermediate iteration, the relative nodal densities are assigned by ranking one of the stress intensity or strain energy values at each node and adjusting the relative nodal densities such that relative density is increased in regions with high stress intensity or strain energy, and is decreased in regions of low stress intensity or strain energy with the overall density distribution assigned according to the prescribed probability function for that iteration.

3. The method as claimed in claim 1, wherein the design domain for the optimal minimum mass structure is at least two dimensional, and wherein the finite element model is at least two dimensional.

4. The method as claimed in claim 1, wherein the optimal minimum mass topology is determined for a structure in which the material strength in tension differs from that in compression, wherein convergence to optimal minimum mass topology is guaranteed by imposing artificial and different material modulus values for regions of tensile and compressive stress states such that the resulting strain field satisfies minimum mass optimality criteria for structures in which the material strength in tension differs from that in compression.

5. The method as claimed in claim 4, wherein the structure includes a fiber reinforced material.

6. The method as claimed in claim 1, wherein the optimal minimum mass topology is determined for dual material structures in which the materials comprise different strengths, wherein convergence to optimal minimum mass topology is guaranteed by imposing artificial and different material modulus values for regions of tensile and compressive stress states such that the resulting strain field satisfies minimum mass optimality criteria for dual material structures.

7. The method as claimed in claim 6, wherein at least one of the material structures includes a fiber reinforced material.

8. The method as claimed in claim 1, wherein the optimal minimum mass topology for structures subjected to multiple alternative loadings is determined by, at each iteration, performing multiple finite element analyses corresponding to multiple alterative loadings, and ranking the maximum stress intensity or strain energy for each node.

9. A method of providing an optimal minimum mass topology for a structure based on a set of design criteria including at least one support point and at least one force to be applied to the structure, said method comprising executing software instructions to perform the steps of:

conducting a finite element analysis on a plurality of nodes within a structure design domain, each of said plurality of nodes having an initial density value;

determining one of a stress intensity or strain energy value for each node;

ranking the nodes by relative stress intensity or strain energy values; adjusting the density value for each node; and repeating the steps of conducting a finite element analysis on said nodes, wherein the step of adjusting each density value for each node is performed according to a family of statistical distribution functions that gradually transition to a bimodal distribution wherein nodes are either fully dense or void thereby providing an optimal topology, wherein the family of probability distributions include a constant probability mean equal to $\rho_o$ where p represents partial density, wherein the design domain is initially defined by $P(\rho=\rho_o)=1$ and $\sigma^2=0$, wherein P represents the probability that $\rho=\rho_0$ anywhere in the design domain and $\sigma^2$ is the probability variance, wherein after a prescribed number of iterations the probability density distribution becomes bimodal with probability values $P(\rho=\rho_o)=1-\rho_o$, $P(\rho=1)=\rho_o$ and $\sigma^2=\rho_o(1-\rho_o)$, and wherein a prescribed number of intermediate continuous probability distributions are used to define the material density distribution at each iteration, wherein average density remains constant, the distribution becomes progressively bimodal and the variance increases monotonically from zero towards $\rho_o(1-\rho_o)$.

10. The method as claimed in claim 9, wherein at each intermediate iteration, the relative nodal densities are assigned by ranking one of the stress intensity or strain energy values at each node and adjusting the relative nodal densities such that relative density is increased in regions with high stress intensity or strain energy, and is decreased in regions of low stress intensity or strain energy with the overall density distribution assigned according to the prescribed probability function for that iteration.

11. The method as claimed in claim 9, wherein the design domain for the optimal minimum mass structure is at least two dimensional, and wherein the finite element model is at least two dimensional.

12. The method as claimed in claim 9, wherein the optimal minimum mass topology is determined for a structure in which the material strength in tension differs from that in compression, wherein convergence to optimal minimum mass topology is guaranteed by imposing artificial and different material modulus values for regions of tensile and compressive stress states such that the resulting strain field satisfies minimum mass optimality criteria for structures in which the material strength in tension differs from that in compression.

13. The method as claimed in claim 9, wherein the optimal minimum mass topology is determined for dual material structures in which the materials comprise different strengths, wherein convergence to optimal minimum mass topology is guaranteed by imposing artificial and different material modulus values for regions of tensile and compressive stress states such that the resulting strain field satisfies minimum mass optimality criteria for dual material structures.

14. A method of providing an optimal minimum mass topology for a structure based on a set of design criteria including at least one support point and at least one force to be applied to the structure, said method comprising executing software instructions to perform the steps of:

identifying a plurality of nodes within a structure design domain, each of said plurality of nodes having an initial density value;

conducting a finite element analysis on said nodes;

determining one of a stress intensity or strain energy value for each node; ranking the nodes by relative stress intensity or strain energy values;

adjusting the density value for each node; and repeating the steps of conducting a finite element analysis on said nodes, wherein the step of adjusting each density value for each node is performed according to a family of statistical distribution functions that gradually transition to a bimodal distribution wherein nodes are either fully dense or void thereby providing an optimal topology, wherein a particular Beta probability distribution is prescribed at each iteration, and is selected to ensure that the total mass is maintained at a constant value for all finite element iterations, and to provide a smooth, gradual transition from the initial uniform partially dense distribution to the final bimodal relative density distribution that defines the optical topology.

15. The method as claimed in claim 14, wherein at each intermediate iteration, the relative nodal densities are assigned by ranking one of the stress intensity or strain energy values at each node and adjusting the relative nodal densities such that relative density is increased in regions with high stress intensity or strain energy, and is decreased in regions of low stress intensity or strain energy with the overall density distribution assigned according to the prescribed probability function for that iteration.

16. The method as claimed in claim 14, wherein the design domain for the optimal minimum mass structure is at least two dimensional, and wherein the finite element model is at least two dimensional.

17. The method as claimed in claim 14, wherein the optimal minimum mass topology is determined for a structure in which the material strength in tension differs from that in compression, wherein convergence to optimal minimum mass topology is guaranteed by imposing artificial and different material modulus values for regions of tensile and compressive stress states such that the resulting strain field satisfies minimum mass optimality criteria for structures in which the material strength in tension differs from that in compression.

18. The method as claimed in claim 14, wherein the optimal minimum mass topology is determined for dual material structures in which the materials comprise different strengths, wherein convergence to optimal minimum mass topology is guaranteed by imposing artificial and different material modulus values for regions of tensile and compressive stress states such that the resulting strain field satisfies minimum mass optimality criteria for dual material structures.

* * * * *